United States Patent

[11] 3,539,015

[72] Inventor Charles V. Schlabs
   Rte. 2, Hereford, Texas 79045
[21] Appl. No. 838,044
[22] Filed June 24, 1969
   Continuation of Ser. No. 576,072,
   Aug. 30, 1966, abandoned.
[45] Patented Nov. 10, 1970

[54] TANDEM PLOW PACKERS
   3 Claims, 7 Drawing Figs.
[52] U.S. Cl. .................................................. 172/202,
   172/540, 172/548, 172/223
[51] Int. Cl. ........................................................ A01b 49/02
[50] Field of Search ............................................ 172/540,
   548, 34, 134, 137, 145, 149—151, 175—178, 161,
   162, 196—199, 200, 232, 314, 676, 202, 203

[56] References Cited
   UNITED STATES PATENTS
| 1,467,056 | 9/1923 | Mix | 172/548X |
| 1,759,597 | 5/1930 | Swanser | 172/137X |
| 2,635,403 | 4/1953 | Gandrud | 172/548X |
| 3,232,354 | 2/1966 | Schlabs | 172/162 |
| 3,357,500 | 12/1967 | Harris | 172/161 |
| 800,974 | 10/1905 | Bollinger | 172/202X |
| 1,751,158 | 3/1930 | Jess | 172/202 |

FOREIGN PATENTS
| 1,122,310 | 1/1962 | Germany | 172/162 |

Primary Examiner—Robert E. Bagwill
Assistant Examiner—Alan E. Kopecki
Attorney—Wayland D. Keith ABSTRACT: A plow packer with a rigid, substantially rectangular frame having spaced-apart, parallel shafts journaled on said frame, on which shafts ribbed, disclike plow packer wheels are mounted in offset, nontracking relation on one shaft with respect to the other shaft, so that the ribbed, plow packer wheels will till substantially the entire surface of the land. A connection means is provided on the forward end of the plow packer frame to connect with a flexible element to enable the plow packer to be towed behind a gang plow to till each land being plowed, so that the plow packer will act upon the lands in overlapping relation. The frame uses a single beam on each side on which shaft bearings are mounted in close relation to the beams to maintain a relatively low center of gravity. A weight box is positioned on the frame to enable additional weight to be applied to the plow packer. The plow packer wheels are mounted on the respective shafts in spaced-apart relation for relative turning movement.

Patented Nov. 10, 1970 3,539,015
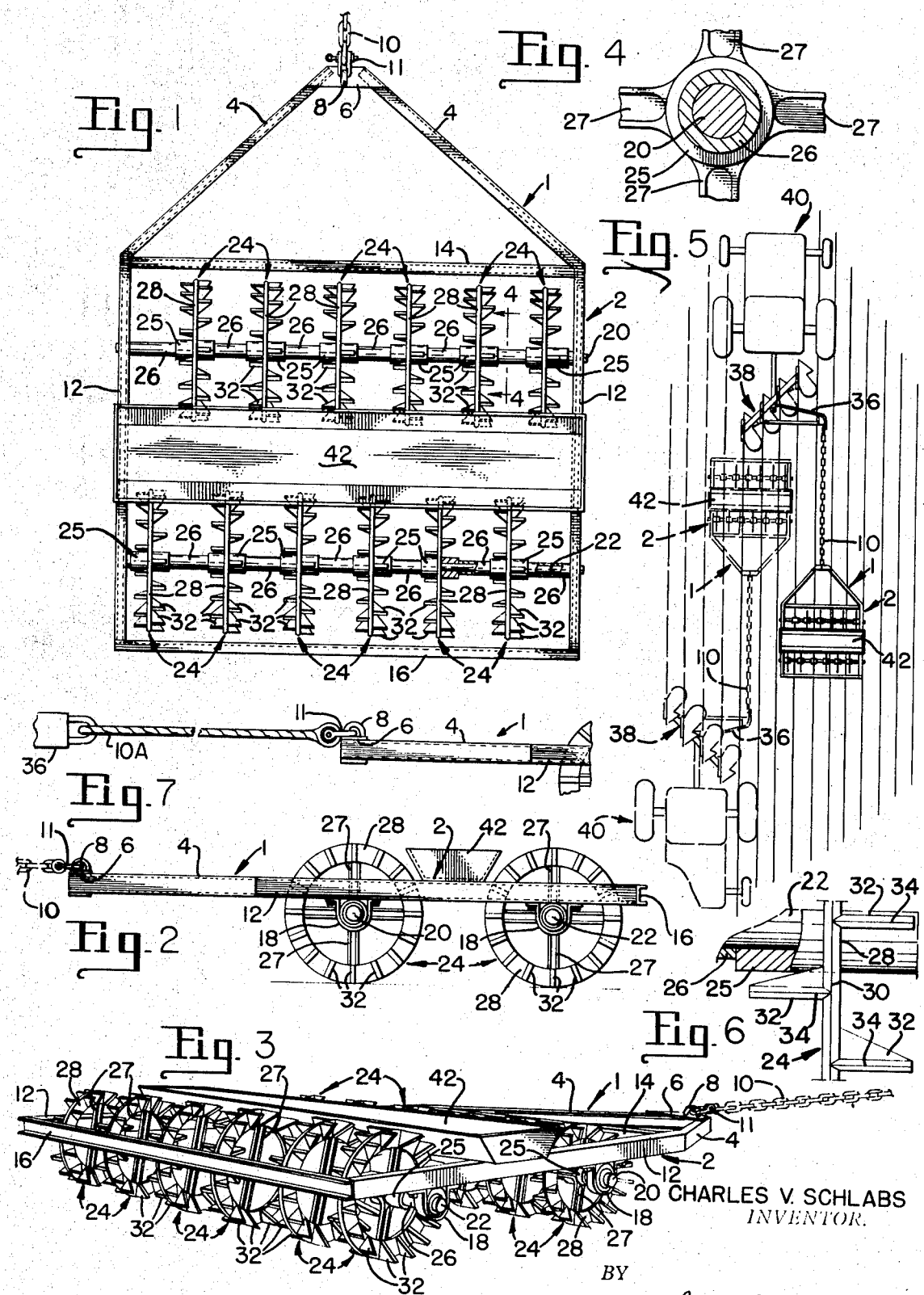

TANDEM PLOW PACKERS

This application is a streamlined continuation of U.S. Pat. application Ser. No. 576,072 filed Aug. 30, 1966, now abandoned.

This application was copending with my U.S. Pat. application Ser. No. 574,127, filed Aug. 22, 1966, for Universal Hitch for Towing Tilling Implements, now U.S. Pat. No. 3,476,191, issued Nov. 4, 1969.

This invention relates to a rotary clod crusher or plow packer and more particularly to rotary, tandem clod crushers or plow packers which may be trailed behind a gang plow during the plowing of the ground, thereby enabling twofold tilling of the soil in a single operation.

Various rotary clod crushers and plow packers have been proposed heretofore, but these, for the most part, utilized a single axle on which rotary plow packer wheels were rigidly mounted in close relation. Furthermore, the frame of this type plow packer was usually attached to a traction element or the like by means of a tongue so as to maintain the frame in operative position and to prevent the frame digging into the ground when pulled behind a tractor, as would be the case if pulled by a flexible towing element.

The present device provides a plurality of rotary plow packer wheels which are mounted on the respective shafts for turning movement thereon, so the packer wheels thereof may rotate independently of the adjacent plow packer wheels. Plow packer wheels are old, per se; however, the usual practice has been to put a multiplicity of these plow packer wheels in side-by-side relation on a single axle for the purpose of tilling the entire ground surface at one pass thereover. When these plow packer wheels are spaced close together, on one shaft, clods and soil will become wedged between the adjacent plow packer wheels and will become compacted therein, particularly in gummy and sticky type soils such as clay-bearing soils, so that the plow packer wheels will not turn relative to each other. Further, when the spaces between and within the plow packer wheels become so filled with compacted soil, the plow packer wheels will fail to crush the clods and compact the plowed ground into a uniform, tilled surface.

In the present invention, the shafts of the plow packer are spaced apart in parallel relation on a frame, with these shafts each being journaled for rotation and being secured against longitudinal movement, and with the plow packer wheels of one shaft being in offset, nontracking relation with respect to the wheels on the other shaft so that the "land" as covered by the first plow packer wheels, is of sufficient width that the remaining portion of the land is acted upon by the subsequent plow packer wheels. However, the wheels of the plow packer are spaced apart longitudinally a sufficient distance so that the soil does not readily abridge therebetween; and since the plow packer wheels are each rotatable on the respective shafts to enable ready turning of the implement, the shafts are each journaled in bearings on the frame to normally enable all plow packer wheels to turn in unison to minimize wear on the shafts.

By having the plow packer wheels arranged on parallel axles or shafts which are mounted in journaled bearings in tandem relation on a mounting frame, the frame will be supported in a horizontal manner. Weighting materials, such as dirt, stones or the like, may be placed within a weight box, thereby causing the wheels of the plow packer to sink to the desired depth in the earth being tilled, so as to perform the desired tilling action.

An object of this invention is to provide a tandem plow packer which may be trailed behind a traction element or plows by means of a flexible element, such as a chain or cable.

Another object of the invention is to provide a plow packer with spaced-apart, transversely arranged, parallel shafts, each shaft having a plurality of plow packer wheels rotatably mounted thereon, the plow packer wheels on one shaft being arranged in nontracking relation with respect to the plow packer wheels on the other shaft and being so spaced that some of the plow packer wheels on the rear shaft will trackmediate the path of the plow packer wheels on the forward shaft to enable the complete tilling of the soil at one pass thereover.

Still another object of the invention is to provide a plow packer having the wheels arranged in spaced-apart, side-by-side relation on shafts, which shafts are arranged in tandem relation, and which plow packer may be attached to a plow by a flexible element for performing a dual tilling action of the soil.

Still another object of the invention is to provide a plow packer which is adapted to be pulled by means of a universal hitch bar which is attached to a two-way, reversible gang plow to enable the plowing and the crushing of the clods to be accomplished at one pass over the ground.

With these objects in mind and others which will become manifest as the description proceeds, reference is to be had to the accompanying drawings in which like reference characters designate like parts in the several views thereof, in which:

FIG. 1 is a top plan view of a tandem plow packer, showing in dashed outline a flexible element, such as a chain, attached to the forward end thereof;

FIG. 2 is a side elevational view of the tandem plow packer, showing a flexible element, such as a chain, attached to the forward end thereof;

FIG. 3 is a perspective view taken from the rear, side and top of the tandem plow packer, showing, in dashed outline, a chain attached thereto;

FIG. 4 is an enlarged sectional view taken on line 4—4 of FIG. 1, looking in the direction indicated by the arrows;

FIG. 5 is a top plan view, on a reduced scale, showing a tractor, a reversible, two-way moldboard gang plow, a universal hitch bar, and the tandem plow packer being towed thereby, and showing land which has been plowed, as indicated in solid lines; the same FIG. shows the tractor, reversible, two-way moldboard gang plows, universal hitch, and the tandem plow packer, in dashed outline, operating in the reverse direction and showing the manner in which the tandem plow packer is connected to the universal hitch bar by flexible element;

FIG. 6 is an enlarged, fragmentary, elevational view showing part of a packer wheel, a packer wheel hub, a packer wheel shaft, and a portion of a spacer, with portions being shown in section to bring out the details of construction; and FIG. 7 is a fragmentary view showing a cable as the flexible element interconnecting the tandem plow packer and the universal hitch on the two-way moldboard gang plows.

With more detailed reference to the drawing, the numeral 1 designates generally a rotary plow packer having a rigid frame 2, which rigid frame 2 is substantially rectangular in form. Members 4 are rigidly connected to the rectangular frame 2 and extend forwardly therefrom in supported relation to form an apex, which members are joined at the apex by a plate 6 on which a loop 8 is secured. The loop connection means 8 is adapted to receive a chain 10, as shown in FIGS. 1, 2, 3 and 5, or cable 10A, as shown in FIG. 7 and to be secured thereto by a clevis 11 or the like.

The frame 2 has side members 12, and front and rear members 14 and 16 respectively. A pair of spaced-apart bearings 18 is mounted on each of the side members 12 to journal the ends of the respective shafts 20 and 22, which shafts are in parallel relation.

Each of the shafts 20 and 22 are journaled in spaced-apart bearings 18 so the shafts will be parallel and transversely arranged on frame 2 with respect to the line of travel. Normally, each of the shafts 20 and 22 rotates freely within the bearings 18, which are preferably antifriction bearings; and, normally, there is no rotational movement between the respective plow packer wheels 24 and the respective shafts 20 and 22 on which they are rotatably mounted. The shafts 20 and 22 are spaced apart a distance greater than the diameter of the packer wheels 24 to give stability to the towed frame 2, so as to enable the frame to be towed behind a plow by means of a flexible element, such as a chain or cable. In turning, the plow packer wheels 24 are free to rotate on the respective shafts; however, the friction between the respective plow packer wheels 24 and the shafts 20 and 22 is much greater than in the bearings. Therefore, on straight-away pulling, the shafts 20 and 22 will rotate within the respective bearings 18, which bearings are mounted on the underside of the frame and the plow packer wheels 24 will rotate in unison with the shafts. The plow packer wheels 24 on one of the shafts are arranged to track in offset relation with respect to the plow packer wheels on the other of the shafts, so that the plow packer wheels on the rear shaft will cultivate the land mediate the land acted upon by the first plow packer wheels.

The plow packer wheels 24 extend above the frame 2, as will best be seen in FIG. 2. The front and rear transverse members 14 and 16 of the rectangular frame are in relatively close relation to the peripheries of plow packer wheels 24, and therefore will not permit soil to accumulate greater than the distance from the axis of the respective shafts 20 and 22 to the respective front and rear members 14 and 16.

The plow packer wheels 24 are maintained in spaced relation by spacer sleeves 26 which are sleeved over the shafts 20 and 22 to abut with the hubs of the plow packer wheels 24 so as to maintain plow packer wheels in spaced relation on the respective shafts 20 and 22.

The plow packer wheels 24 each comprise an annular disclike member 28, which preferably has a rounded or cutting edge 30 around the outer periphery thereof, with alternate outstanding ribs or blades 32 on each side thereof. Each of the outstanding blades 32 has a rounded or cutting edge 34 thereon so as to perform a cutting or packing action on the clods as the plow packer is moved over the terrain. An enlarged, fragmentary detail of the periphery of one of the wheels of the plow packer is shown in FIG. 6.

Each plow packer wheel 24 has a hub 25 therein from which spokes 27 radiate and connect with annular disclike member 28. The hubs 25 preferably have ends that abut with the ends of tubular spacer members 26 to prevent relative longitudinal movement of plow packer wheels 24 on the respective shafts 20 and 22. A portion of one of the tubular spacer members 26 is broken away, in FIGS. 1 and 6, to show the shaft 22. Furthermore, FIG. 4 discloses an enlarged, fragmentary view of the hub 25 and spokes 27 to show the relation of the shaft 20, spacer sleeve 26 and hub 25 of the plow packer wheels 24, with the shaft 20 and sleeve 26 being shown in section.

By mounting the shafts 20 and 22 parallel and a spaced distance apart, the rotary plow packer 1 will operate on an even keel; so, as the plow packer 1 passes over the terrain, the forward series of plow packer wheels 24 will crush and pack the clods in spaced-apart lands. However, the plow packer wheels 24 on the rear shaft 22 will act upon the lands intermediate the lands, acted upon by the wheels on shaft 20. It is preferable to have the plow packer wheels 24 on the rear shaft 22 of such face a width as to perform a complete tilling action on the entire surface of the soil without leaving an area which has not been acted upon by the plow packer wheels 24 on shaft 20.

By having the plow packer wheels 24 arranged in tandem, in the manner shown, the rotary plow packer 1 may be trailed by means of a flexible element, such as the chain or cable 10, secured at one end to a hitch bar 36 mounted on a two-way, reversible moldboard gang plow 38, which plow 38 is being drawn by a traction element 40.

FIG. 5 shows the rotary plow packer 1, in full outline, being drawn in one direction and the rotary plow packer, as shown in dashed outline, being drawn in the opposite direction by the traction element 40, rearwardly of the gang plow 38 to illustrate the complete coverage of the terrain being tilled.

The flexible element 10 is connected to the forward end of the rigidly extending element 4 and to the hitch bar 36, on the plow 38, so as the plow is moved across the field, the tandem plow packer will be trailed, by the flexible element 10, so as to cultivate and pulverize the earth being plowed, and upon reversal of the tractor, reversible gang plows, and hitch bar connected thereto, the point of pull of the flexible connection on the hitch bar will be moved to the opposite side of the medial plane passing longitudinally through the tractor, to plow the adjacent land, as shown in FIG. 5. The flexible element permits the tandem plow packer to be turned to follow the plow onto the adjacent land, as indicated in FIG. 5. By having the element 10 flexible, it enables the tractor 40 to make a substantially U-turn at the end of the land being plowed and come back on a land adjacent thereto after reversing the two-way gang plow 38 and the universal hitch bar 36, whereupon, the tandem plow packer will make the turn and follow the plows without the flexible element 10 becoming entangled with the plows or with the packer.

A troughlike receptacle or box 42 is mounted on side members 12 of frame 2 and extends therebetween to receive weighting material such as dirt, stones or the like, so that the annular disclike member 28 and outstanding blades 32 of the plow packer wheels 24 will sink into the soil to a desired depth to cut and pack the clods and to till the soil in the desired manner. This will enable a thorough cultivating action to be accomplished simultaneously with the plowing action of a gang plow such as indicated at 38.

I claim:
1. A combination including:
   a. a gang plow;
      a hitch bar connected to the plow and laterally outstanding therefrom;
   b. a rigid plow packer frame;
      1. a member rigidly connected to the packer frame and extending forwardly therefrom in rigid supported relation;
      2. a connection means near the forward end of said rigid member;
   c. a flexible element, which element is capable of flexing substantially throughout the entire length thereof, interconnecting the hitch bar on said plow and said connection means, near the forward end of said rigid member on said frame;
   d. a pair of parallel shafts mounted in journaled relation on said frame, which shafts are a spaced distance apart and are perpendicular to the line of travel of the plow;
   e. each said shaft having a plurality of disclike packer wheels mounted thereon for rotation about the axes thereof;
      1. each said disclike plow packer wheel having outstanding cutting blades around the periphery thereof;
      2. said disclike plow packer wheels being spaced apart on the respective shafts, so the disclike packer wheels on one said shaft will be in nontracking relation with respect to the packer wheels on the other of said shafts;
   f. the gang plow, to which the hitch bar is attached, is a two-way reversible plow; and
   g. said hitch bar, attached to said two-way gang plow, is movable therewith so as to change the point of pull of said flexible connection, upon reversal of the two-way plows and the hitch bar.

2. A combination, as defined in claim 1; wherein said flexible element is a chain.

3. A combination, as defined in claim 1; wherein said flexible element is a cable.